US010455394B1

(12) United States Patent
Sheeley et al.

(10) Patent No.: US 10,455,394 B1
(45) Date of Patent: Oct. 22, 2019

(54) BIFURCATION OF PAN FUNCTIONALITY

(71) Applicant: Williams Sound Holdings II, LLC, Eden Prairie, MN (US)

(72) Inventors: Robin Sheeley, Maple Plain, MN (US); Dustin Kassel, Maple Plain, MN (US)

(73) Assignee: Williams Sound Holdings II, LLC, Eden Prairie, MN (US)

( * ) Notice: Subject to any disclaimer, the term of this patent is extended or adjusted under 35 U.S.C. 154(b) by 0 days.

(21) Appl. No.: 16/238,601

(22) Filed: Jan. 3, 2019

Related U.S. Application Data

(60) Provisional application No. 62/726,456, filed on Sep. 4, 2018.

(51) Int. Cl.
*H04W 4/80* (2018.01)
*H04W 84/10* (2009.01)

(52) U.S. Cl.
CPC .............. *H04W 4/80* (2018.02); *H04W 84/10* (2013.01)

(58) Field of Classification Search
CPC ..................................................... H04W 48/20
See application file for complete search history.

(56) References Cited

U.S. PATENT DOCUMENTS

| | | | |
|---|---|---|---|
| 8,472,427 B1* | 6/2013 | Wheeler | H04W 72/1215 370/348 |
| 9,614,970 B1 | 4/2017 | De Jong et al. | |
| 2003/0151513 A1* | 8/2003 | Herrmann | G08B 25/003 340/573.1 |
| 2005/0025161 A1* | 2/2005 | Spooner | H04L 12/66 370/401 |

\* cited by examiner

*Primary Examiner* — Hsinchun Liao
(74) *Attorney, Agent, or Firm* — Tysver Beck Evans

(57) ABSTRACT

Personal area network (PAN) functionality is partitioned between a pod cluster controller (PCC) and one or more separately housed "pods" with which it communicates. A pod includes a transceiver, providing the PAN to some area. The PCC communicates audio and control data with its pods, which together form a cluster, and may provide power to them. The structure of a pod can be simple, because the PCC can handle various services on behalf of its pods—for example, the PCC can interface with external analog audio devices (e.g., audio speaker, microphone); digital devices; peripherals; or the Internet. The PCC may encode/decode and multiplex/mix audio data. The partitioning can mitigate various PAN issues such as line-of-sight and metal interference, and can extend a pod cluster to have arbitrarily large PAN spatial coverage.

27 Claims, 16 Drawing Sheets

BIFURCATION OF PAN FUNCTIONALITY

CROSS-REFERENCE TO RELATED APPLICATION

This application claims the benefit of U.S. Provisional Application No. 62/726,456, filed Sep. 4, 2018, which is hereby incorporated by reference in its entirety.

FIELD OF THE INVENTION

The present invention relates to personal area networks (PANs). More specifically, the present invention relates to PANs where transceiver functionality is housed separately from control functionality.

BACKGROUND OF THE INVENTION

Wikipedia defines BLUETOOTH® (hereinafter, "BT") as a "wireless technology for exchanging data over short distances . . . from fixed and mobile devices, and building personal area networks (PANs)." Where the PAN is BT based, the PAN is referred to as a "piconet". The PAN includes a master device, containing a BT transceiver, and one or more slave devices. Under the BT 4.x specifications, the typical range from a master to a slave is less than 10 m, although obstructions to line-of-sight between interacting devices, and various other types of interference, may reduce that range. Under the BT 5.0 specification, the typical range is about four times that of 4.x, again subject to line-of-sight. BT 5 is backward compatible with BT 4, but the range for interaction between a BT 4 device and a BT 5 device will be the lower, BT 4, range. Under BT 4, the maximum number of connected slaves is 7; under BT 5, there can be up to 999 connected slave devices.

BT slave devices connect to a BT master according to a profile. The profiles include, among others, an advanced audio distribution profile; an audio/visual remote-control profile; a handsfree profile; a headset profile; a file transfer profile; and a human interface profile. BT 4 prevents a master from having multiple simultaneous slave connections using the same profile. BT 5 removes this limitation.

BT-enabled devices (i.e., devices containing a BT transceiver) include, for example, computers, tablets, mobile phones, headsets, hearing aids, and the Internet of Things (IoT). For purposes of this document, including associated claims, a hearing aid will be regarded as a headset.

Applications of BT protocols include, for example: audio or visual communication, such as mobile phone transmissions; transmission of a document to a printer or other device (e.g., IoT); and sharing of documents (e.g., photographs) among users.

In general, a "communication system" may enable certain devices to communicate electronically. A given communication system may utilize any kinds of hardware or software; it may be wired or wireless; it may use any information format or protocol; it may be a PAN, a LAN, or a WAN. Communication systems are recursive, in the sense that any combination of communication systems is itself a communication system.

By a "venue", we mean any place where BT (or other PAN type) wireless service is to be made available to users. A venue might be, for example, a room, a plurality of rooms, a whole building, a plurality of buildings, a sports stadium, or an area in a park.

SUMMARY OF THE INVENTION

Other transmission standards/protocols/means may behave similarly to BT with respect to considerations of range, line-of-sight, and metal interference. The scope of the invention(s) described herein should therefore not be regarded as limited to BT technology as such. Within the instant document and claims, BT, in effect, is a proxy or umbrella for itself as well as all similar or related personal area network (PAN) technologies.

A conventional BT controller is a housed device that receives and transmits analog and digital audio data through its interfaces; codes and decoders audio formats for compatibility with the various devices with which it interacts, including an internal BT transceiver; multiplexes to combine audio streams; and possibly interacts with external resources over a wide-area network (WAN) such as the Internet, or a local-area network (LAN). The conventional BT controller is itself under some external control, by a user interface or by some external processing system. The conventional controller acts as a BT master, providing BT slaves access to various services.

Such a BT transceiver housed in a controller suffers some significant limitations for BT data exchange. A controller may be relatively bulky, too space-consuming and unsightly to position in many areas where user devices are expected to require BT connectivity. Additionally, the controller will typically require wiring for various external connections and devices. The range of the controller's transceiver also becomes a severely limiting factor to overall PAN coverage. Often, it will be desirable for security or esthetic reasons to isolate the controller in a separate room or closet, line-of-sight blocked by walls, doors, or partitions from the PAN user area. Even if the controller is located in the same room as user devices, typically the controller must be close to the ground to be operator-accessible for maintenance and control. Line-of-sight between the controller and PAN devices may be blocked. And in industrial and commercial settings, controller boxes are typically housed in an electronics rack or cabinet that contains metal parts. Metal interferes with BT transmissions.

The present invention decouples BT transceiver functionality from the controller, encapsulating that functionality in one or more BT pods, leaving the controller to perform management of the pods and various central functions, such as interaction with external devices, audio multiplexing, and audio encoding/decoding. A BT pod (hereinafter, a "pod") can be a very simple device—a housing, which contains a transceiver that serves as master for a BT PAN, and a means for communicating audio and control data with the simplified controller, a "pod cluster controller" (PCC). A single PCC can control one or more pods, the pods deployed in some spatial arrangement, a "pod cluster". With a plurality of pods, the cluster might be regularly spaced and symmetrical, irregularly spaced or asymmetrical, or some mixture thereof. The range of BT PAN coverage provided by a single PCC becomes effectively unlimited, and could even cover disjoint areas while still under coordination of the PCC. Indeed, a PCC can serve as hub for multiple clusters, and/or interface with another PCC, possibly by WAN.

In some embodiments, the pod includes a housing, a BT transceiver, a connector for communicating with the PCC, a digital audio interface between the connector and the transceiver, a digital control interface between the connector and the transceiver, and a power converter to convert power received through the connector to a form usable by the components of the pod. The connector might be an ethernet connector, and connection to the PCC might be by ethernet cable, such as CAT5 or CAT6. Such a pod would not contain at least one of: (1) analog audio connections; (2) Internet connectivity; and (3) an external control connection, other than the PCC connection; (4) audio encoding/decoding functionality; and (5) audio multiplexing functionality. Any combination of one or more of these elements may be absent from a pod; preferably, all will be missing.

If the PCC-to-pod communication is by cable, such as an ethernet cable, the pod can receive its power from the PCC. In this case, the pod may have a converter to convert incoming power into a form usable by components of the pod. Depending on embodiment, the PCC can coordinate, and broker interactions among, one or more pods in a cluster; it can provide external communication access, such as to the Internet, other PCCs, or cell phone networks; it can communication with analog audio devices, such as speakers and microphones; it can connect to printers and IoT devices; and it can code/decode, and multiplex. The PCC can also perform administrative tasks such as monitoring state of system components, including pod functionality. The PCC itself might itself be controlled by external devices, such as another computer or server, a user through a user interface, or another PCC.

A pod may have an identifier that distinguishes that pod from the others. To provide unobstructed line of sight, pods preferably will be embedded into a ceiling or otherwise suspended in a venue, although pod location is not a limitation of the invention.

Each user mobile device is potentially a bridge to an external network. For example, a mobile phone of person X, which is connected to a pod (and thereby to the PCC and thereby potentially to other LAN users on the same or other pods) might also be connected by a mobile phone network person Y using a remote mobile phone. Person Y has two-way communication with the PCC, which can select what data Y's mobile phone receives, and how communications of data received from Y's mobile phone are processed.

Pods might be connected directly with the PCC, by cable or wirelessly, creating a hub and spoke topology. Alternatively, pods might be meshed wirelessly, with data being passed point-to-point between pods, possibly with a single pod connected by cable or wirelessly with the PCC. Any configuration topology among pods, and between pods and the PCC, is within the scope of the invention.

Assisted listening is a particularly interesting application of the pod cluster concept. Members of an audience or other group of listeners may have trouble hearing a presenter or a broadcast. The audio amplitude may be low for the venue; for example, a lecturer may speak too softly for a large classroom. Even in a room with perfect acoustics, ambient noise may interfere. A pod cluster such as described herein will enable anyone with a BT headset to have assisted hearing of audio transmission in, for example, a church, a lecture hall, or a noisy sports venue.

If the pods implement the BT 5 specification, then up to 999 multiple user headsets can be connected to a single pod and receive the same audio stream or signal from the PCC through the pod. A BT headset is a relatively inexpensive device that can enhance an individual's listening experience. Many types of hearing aids are BT-enabled, as are many mobile phones, tablet computers, and laptops. For purposes of this document, including the claims, we will regard a BT hearing aid as a type of BT headset.

As mentioned previously, headsets typically have a limited reception range, and so long as BT 4 devices are in common use, the range for data exchange between, say, a BT headset and a BT 5 pod will be less than 10 m. By distributing multiple pods throughout a venue, coverage of an audio transmission can be expanded. In effect, each pod has a 10 m coverage zone. By overlapping zones of adjacent pods, whole regions of a room can have PAN coverage for assisted listening of the same audio broadcast. The pod cluster PCC can create an audio stream from, for example, a single microphone or external source, or by exploiting its various capabilities, mix and match audio information from multiple sources.

DETAILED DESCRIPTION OF EXEMPLARY EMBODIMENTS

Figure 1:
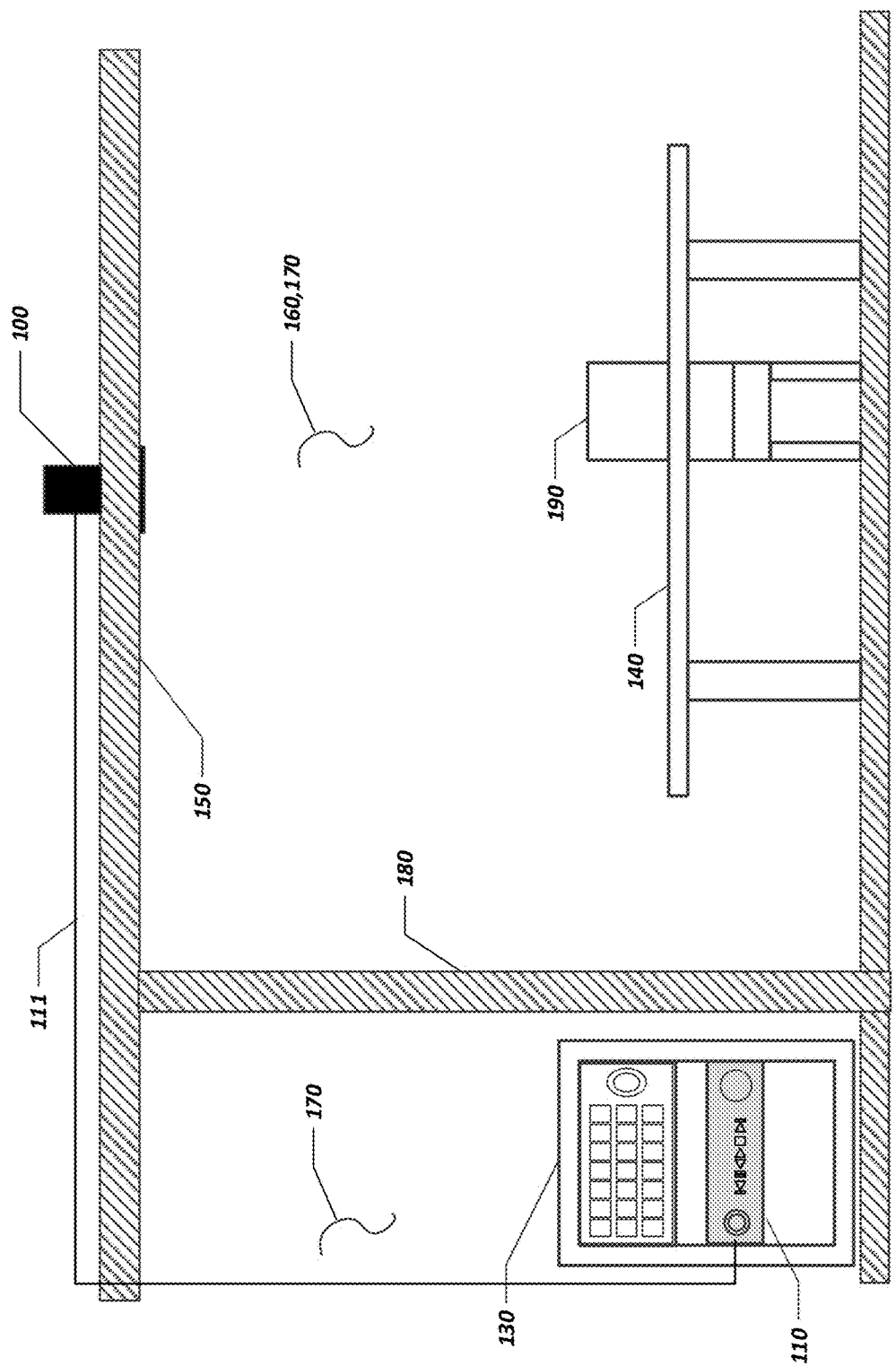
FIG. 1 is an exemplary vertical cross section through a venue, showing a pod installed in a ceiling, connected by cable to a pod cluster controller (PCC) in another room.

This description provides embodiments of the invention intended as exemplary applications. The reader of ordinary skill in the art will realize that the invention has broader scope than the particular examples described here. It should be noted from the outset that the drawings, and the elements depicted by the drawings, may not be to scale. Generally, reference numbers are keyed to the drawing of first appearance. For example, reference number 320 would appear first in FIGS. 3 and 460, in FIG. 4. Each such reference will be described at least once, ordinarily in connection with the figure of first appearance. For clarity of the drawings, a given reference number that appears in a second figure will not necessarily be described a second time. To avoid clutter within a given drawing, a single object that is typical of several identical objects in that drawing may be labeled as representative of the group.

FIG. 1 is an exemplary vertical cross section through a venue 160, showing a BT-enabled (or, more generally, PAN-enabled) pod 100 installed in a ceiling 150, and connected by pod cable 111 to a pod cluster controller (PCC) 110. The pod 100 serves as a BT master for a LAN. The pod 100 and PCC 110 are in separate rooms 170, separated by a wall 180 (or some other barrier, such as a door or partition). Although the rooms 170 shown happen to be adjacent, a single PCC 110 can control pods 100 in multiple rooms, with the only distance limitation being the length of the connecting pod cable 111 or other connecting communications means (e.g., WAN or LAN). Scope of coverage can be arbitrarily extended by increasing the number of connected pods 100. The PCC 110 is esthetically hidden from occupants of the venue 160. It is near floor level, in a rack 130, which we will assume is metal, near to other metallic components. The room 170 containing the PCC 110 might be locked for security. Bifurcation of PAN functionality facilitates such isolated controller deployment without compromising the BT PAN.

Because of the separate deployment of the pod 100 in the ceiling 150, (1) BT capability is close to any user 310 seated in a chair 190 at table 140; (2) line-of-sight from a user device 300 to pod 100 is unobstructed; (3) the pod 100 is far away from metal objects; and (4) the pod 100 can be made unobtrusive, similar in appearance to a ceiling-mounted audio speaker. In addition, the PCC 110 can take advantage of various connections and other electronic components in the utility room 170 or closet where it is housed.

Figure 2:
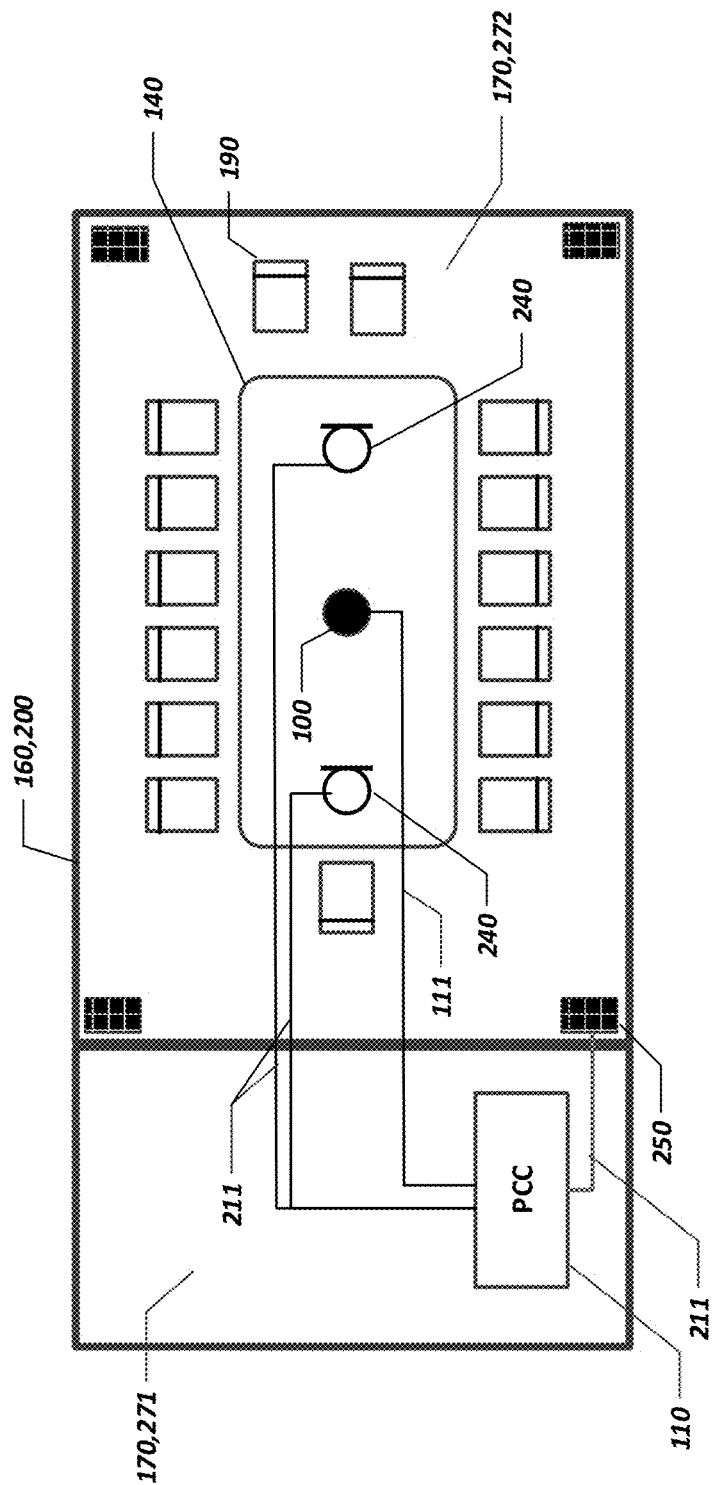
FIG. 2 is an exemplary top view of a conference room configuration, showing a pod, microphones, and speakers connected to a PCC in another room.

FIG. 2 is an exemplary configuration, a top view of rooms 170 in building 200 similar to those of FIG. 1. Conference room 272 contains two microphones 240 and four audio speakers 250, which are each connected by wire 211 to the PCC 110 in room 271 (although only one speaker connection is shown in the figure). The pod 100 is connected by pod cable 111 to the PCC 110. The pod 100 can serve as a BT master, providing PAN services to attendees of a meeting. For example, an attendee might: share calendar appointments or contacts; broadcast a conversation received by a mobile phone through a wireless phone network; use a printer; access building phone service; or send or receive a digital photo. Other pods 100 can be similarly deployed, connected to PCC 110, in other rooms 170 or areas. Thus, the flexible functionality of the PCC 110 is shared and dispersed.

This particular configuration might be used for distributed audio conferencing. Audio can be received over a communication system 1060 by the PCC 110 from a source external to room 271, which might be, for example, a single individual who wants to patch in to the conference, or from a remote conference room, possibly similarly equipped. The audio stream is broadcast over audio speakers 250. The microphones 240 send audio from this conference room 272 to the PCC 110; the PCC 110 transmits that audio to the external participants. Particularly if the pod 100 supports BT 5, it can provide assisted listening of audio from the PCC 110, which might be of internal or external origin or both (possibly using audio coding/decoding and multiplexing capabilities of the PCC 110) to multiple attendees having PAN-compatible headsets 302. A user mobile phone 301, might act as a bridge between the pod cluster 1000 and an external phone network.

Figure 3:
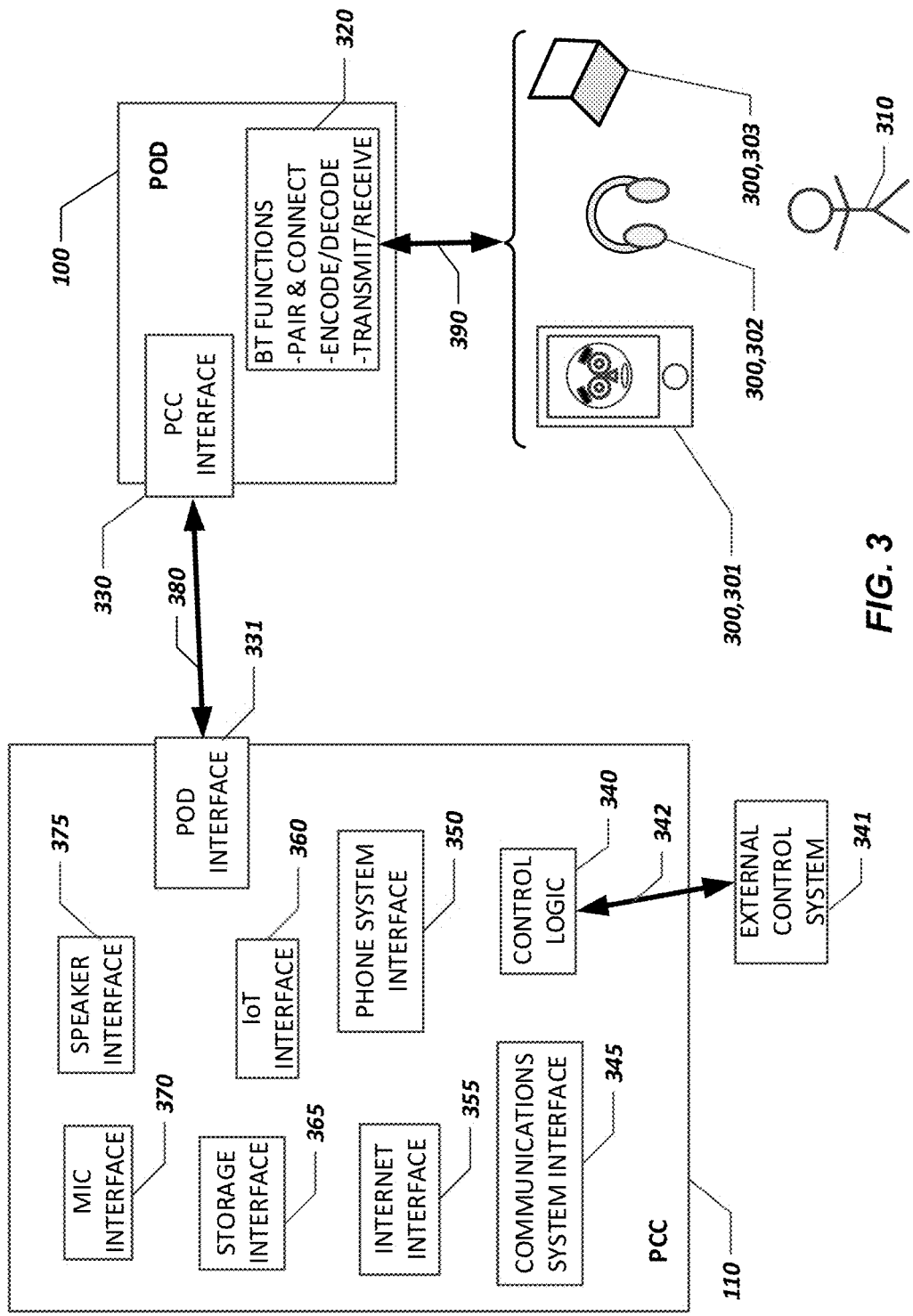
FIG. 3 is a block diagram, illustrating an exemplary partition of functionality between a pod, a PCC, and user PAN-enabled devices.

FIG. 3 is a block diagram, illustrating an exemplary partition of functionality between a pod 100, a PCC 110, and PAN-enabled user devices 300. A user 310 is shown with some typical user devices 300, including a mobile phone 301, a headset 302, and a computer 303. The user devices 300 communicate with the pod 100 using BT, as indicated by arrow 390. BT functions 320 of the pod 100 include: pairing with the user device 300; connecting with the user devices 300; encoding and decoding audio signals to convert between BT formatting and audio formatting compatible with the PCC 110; and exchanging data with user devices 300. The pod 100 has two-way communication through PCC interface 330 with the PCC 110, as indicated by arrow 380.

The pod 100 can send requests and associated data from a user device 300 to the PCC 110. The PCC 110 can take appropriate action to respond, such as replying to the user device 300 through the pod 100.

In addition to communicating with the pod 100 through pod interface 331, the PCC 110 may perform various other functions, all under management of its control logic 340. The control logic 340 includes both hardware and software elements; also, each interface shown includes at least one hardware element. To carry out these functions, the logic 340 acts through interfaces, which may include, for example: a speaker interface 375; a microphone interface 370; a storage interface 365; an IoT interface 360; a phone system interface 350; a communication system interface 345; a Internet interface 355; and an external control system interface 480, whereby an external control system 341 might exert some control over the behavior of the PCC 110, the the pod cluster 600, and connected systems, through control logic 340. A given pod cluster 600 might contain any mixture or subset of the components shown in the figure, and it might contain additional elements.

Figure 4:
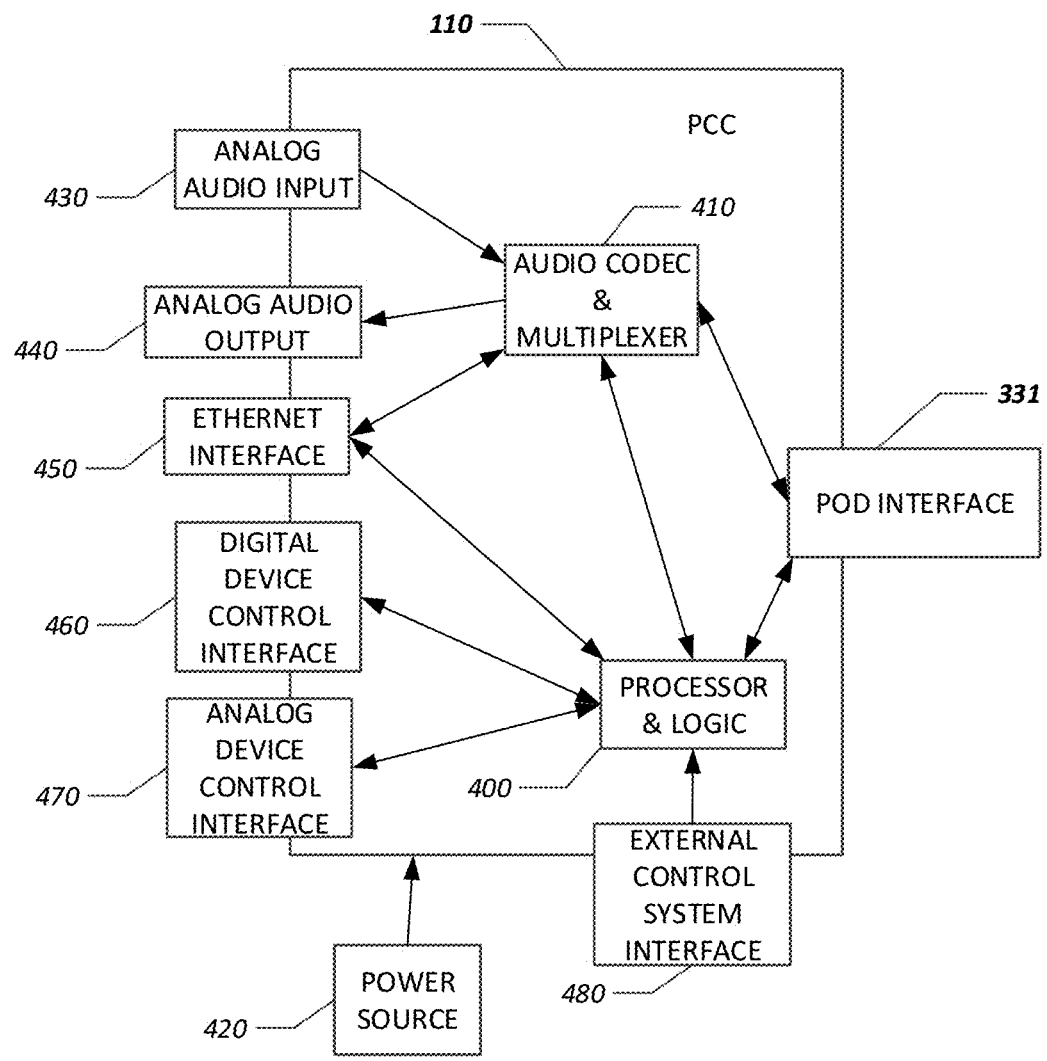
FIG. 4 is a block diagram, illustrating an exemplary embodiment of a PCC.

FIG. 4 is a block diagram, illustrating an exemplary embodiment of a PCC 110. This PCC 110 includes a pod interface 331 for communication to a pod 100. If the connection to the pod 100 is wired, there may be other such pod interfaces 331 for connection to other pods 100. Alternatively, the PCC 110 may communicate with a pod 100 wirelessly by, for example, WiFi. The PCC 110 contains a processor and logic 400, where "logic" means some combination of hardware and software that executes tasks. The processor and logic 400 manage operation of the PCC 110 and coordinate interactions with external devices, including pods 100. The PCC 110 contains an audio codec and multiplexer 410, which put audio information into a respectively appropriate format for devices with which the PCC 110 interacts, and can combine audio streams into a single stream. The PCC 110 includes interfaces for analog audio input 430 and analog audio output 440. This PCC 110 contains an ethernet interface 450. The PCC 110 includes a digital device control interface 460 and an analog device control interface 470 to interact with external devices; examples include cameras, printers, microphones, and speakers. The PCC 110 is powered by a power source 420, such as a connection to a wall outlet or a battery (which might be internal). Note that in other embodiments, some or all of the components shown along the left side of the PCC 110 in FIG. 4 may be missing; also, other components not shown may be present.

Figure 5:
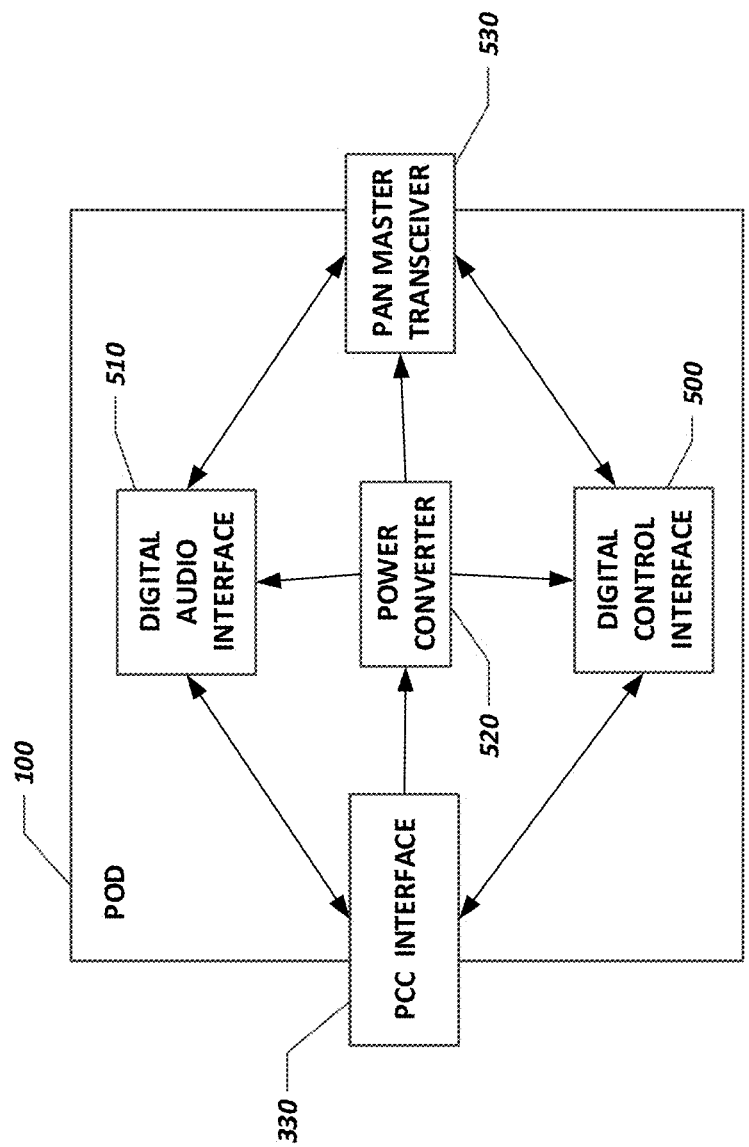
FIG. 5 is a block diagram, illustrating an exemplary embodiment of a pod.

FIG. 5 is a block diagram illustrating an exemplary embodiment of a pod 100. The pod 100 contains a PAN master transceiver 530, which provides a BT LAN. It contains a PCC interface 330, whereby the pod 100 communicates with the PCC 110. In this embodiment, as shown below in FIG. 6, the PCC interface 330 provides bidirectional audio and control, to the pod 100, and also provides power. The pod 100 contains a power converter 520, which converts power received through the PCC interface 330 into a form usable by components of the pod 100. A digital control interface 500 and a digital audio interface 510 facilitate communication between transceiver 530 and PCC interface 330. Note that a given pod 100 embodiment might contain additional components. If the connection to the PCC 110 is wireless, then the pod 100 might have its own power supply, and might not require a power converter 520. This power supply might be, for example, "house" power or a battery.

This pod 100 embodiment is notable for what it does not contain: an audio mixer or multiplexer, an Internet interface; analog audio input; analog audio output; a digital device control interface; an analog device control interface; an external control system interface (other than the PCC interface 330). Preferably, as previously discussed, these components are provided, if at all, by the PCC 110. In general, every pod 100 will be missing at least one of these components, and possibly one or more others, in any combination. By a "pod structure", we mean the housing of the pod and its components.

Figure 6:
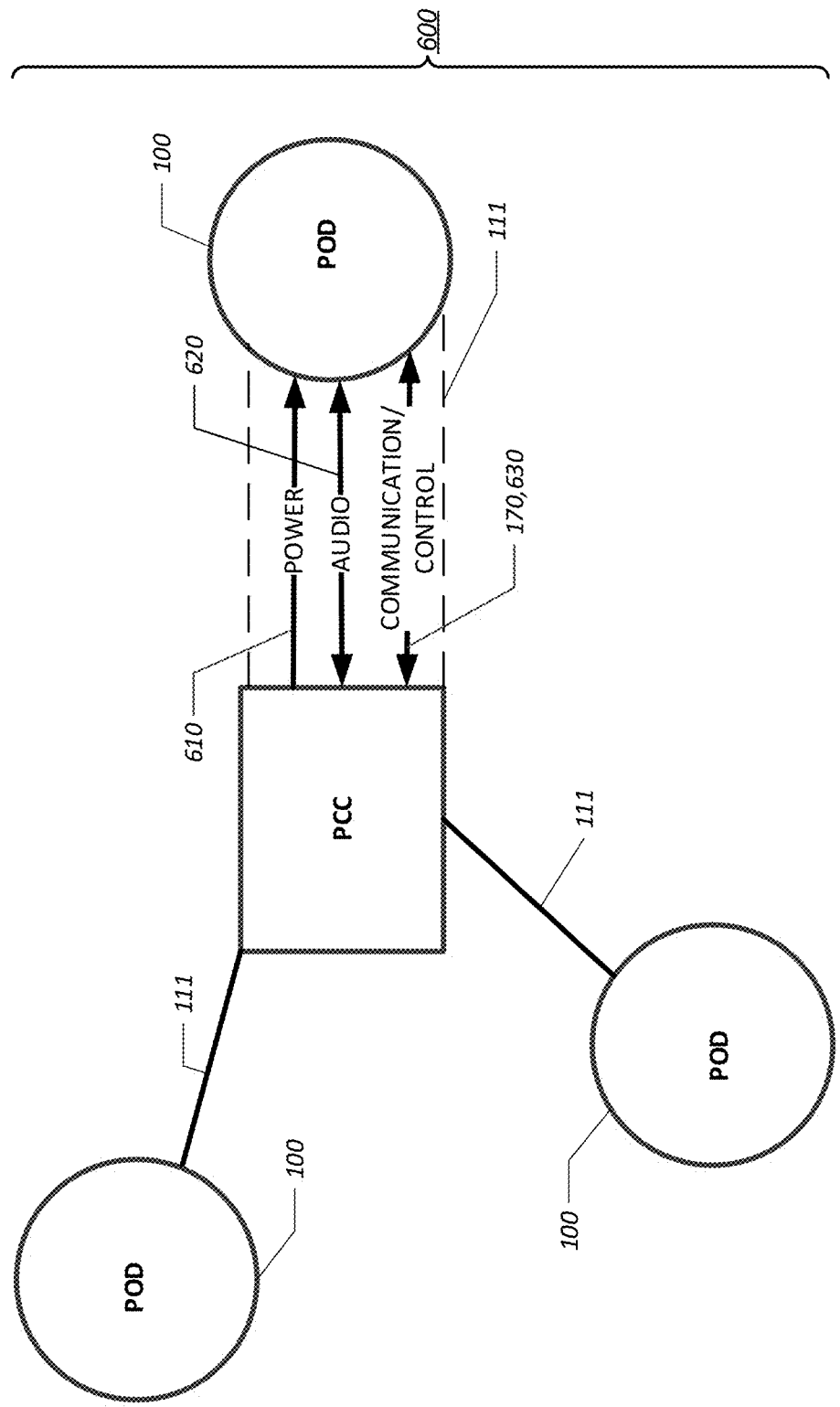
FIG. 6 is a conceptual diagram, illustrating one embodiment of communication between a PCC and pods.

FIG. 6 illustrates an embodiment in which the pod cable 111 between a pod 100, in a pod cluster 600, and a PCC 110 is a CAT 5 or similar cable. The pod cable 111 provides three channels: a unidirectional power channel 610, whereby the PCC 110 powers the pod 100; a bidirectional audio channel 620 for audio data; and a bidirectional communication/control channel 630 for any control data, requests for action, data, and transfers other than audio data. Of course, in other embodiments, wireless communication between a PCC 110 and a pod 100 is also possible, and a pod 100 might receive its power from a source other than the PCC 110. The control logic 340 may coordinate with or act under the direction of some external control system 341, which might be, for example, a computer or a user interface.

Figure 7:
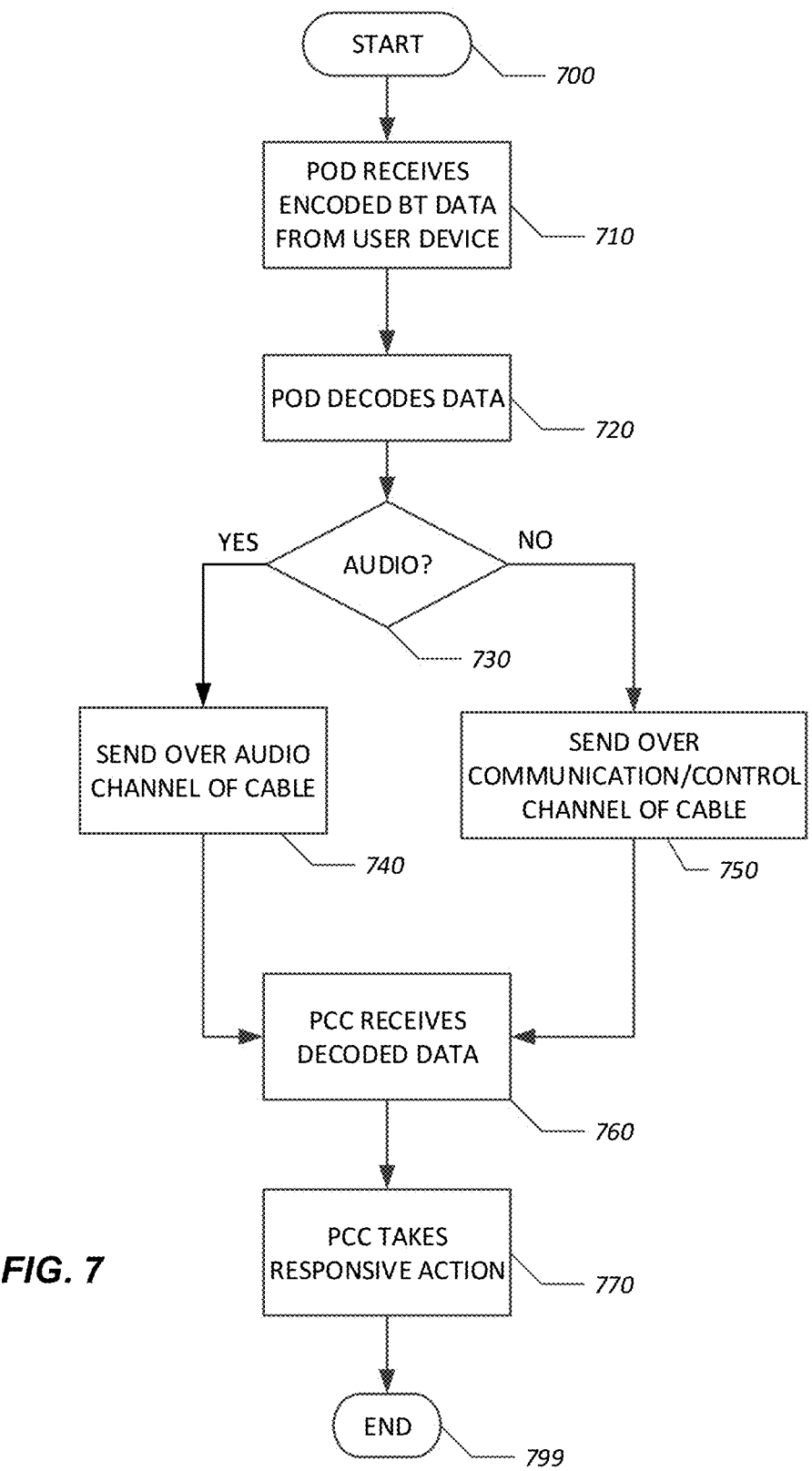
FIG. 7 is a flowchart illustrating an exemplary process for handling data received from a user device by a pod that is deployed remotely from a PCC.

In some embodiments, BT transmissions from a user device 300 are encoded by the device and sent over a radio frequency (RF) link to the pod 100. FIG. 7 illustrates processing of such a transmission, using the pod cable 111 communication system described in FIG. 6. After the start 700, the pod 100 receives 710 the encoded data from the user device 300. The pod 100 decodes 720 the information. If 730 decoded data is audio, it is sent 740 over the audio channel 620. Otherwise 750, it is sent 750 over the communication/control channel 630. The PCC 110 interprets the data it receives 760 from the pod 100 over these channels using its logic 340, and takes appropriate action 770, possibly using one or more interfaces, such as those shown in FIG. 3.

Figure 8:
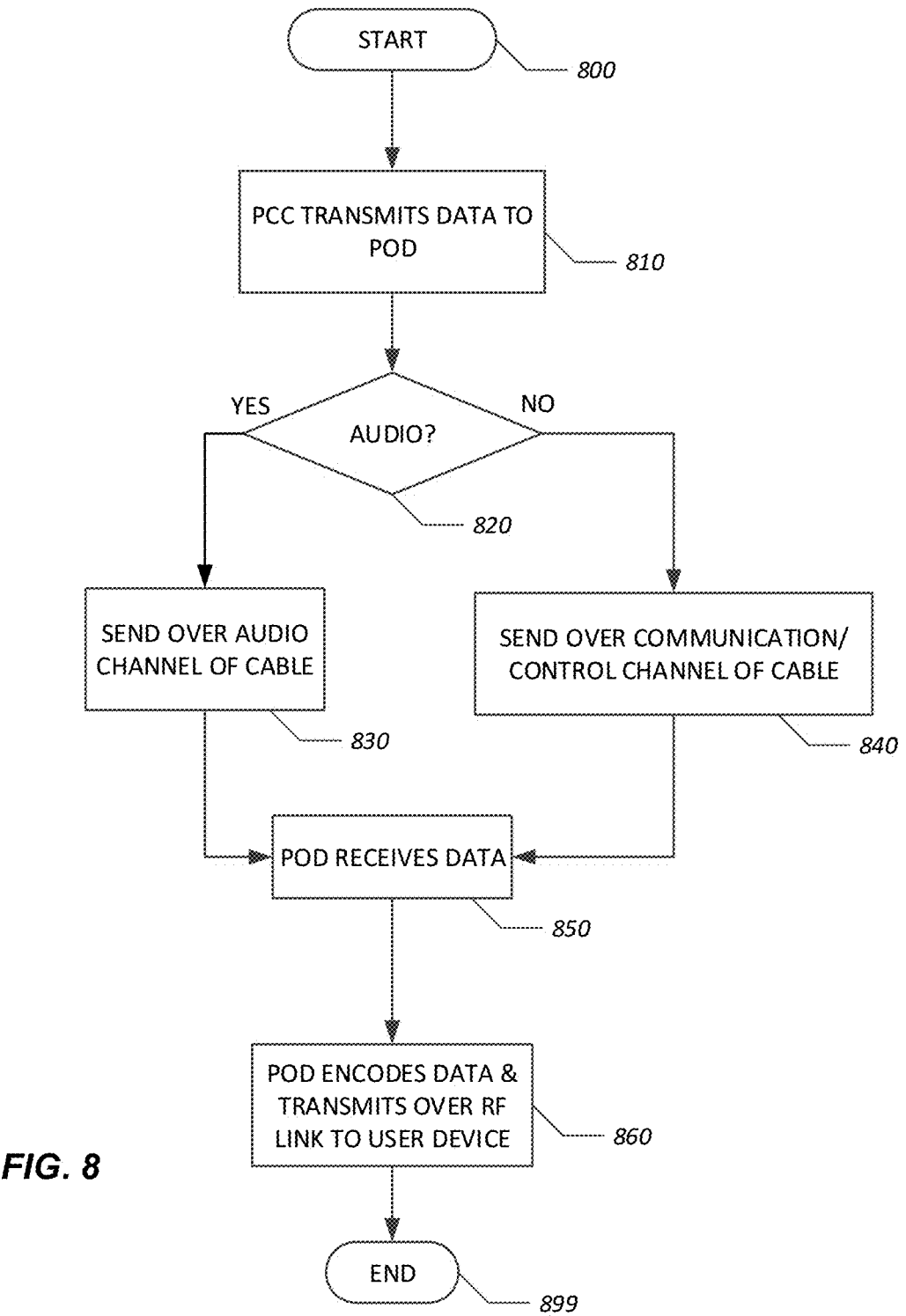
FIG. 8 is a flowchart illustrating an exemplary process for handling data transmitted from a PCC to a pod that is deployed remotely from a PCC.

The embodiment illustrated by FIG. 8 also uses the pod cable 111 of FIG. 6. The PCC 110 transmits 810 data over pod cable 111. If 820 decoded data is audio, it is sent 830 over the audio channel 620. Otherwise 840, it is sent 840 over the communication/control channel 630. The pod 100 receives 850 the data. If data transmission to one or more user devices 300 is required, the pod 100 encodes 860 the data and transmits it to those pods 100.

Figure 9:
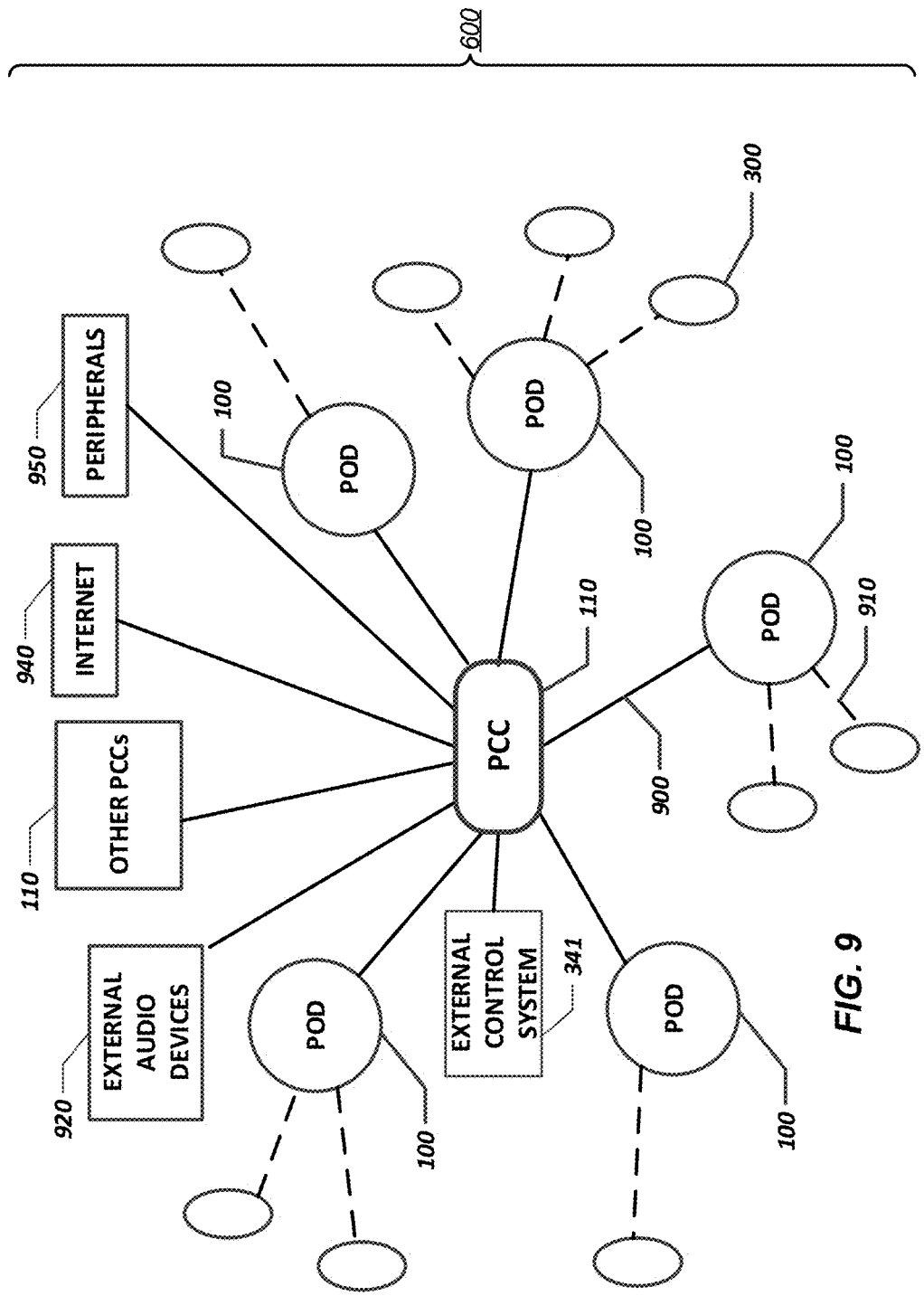
FIG. 9 is a block diagram, illustrating an exemplary pod cluster, including a PCC hub with pod spokes, wherein the PCC coordinates the pods and provides external services, and the pods provide PANs to user devices.

FIG. 9 is a block diagram, illustrating an exemplary pod cluster 600, including PCC 110 hub with pod 100 spokes. The PCC 110 may, for example, receive from, and send to, the pods 100 audio and control data; communicate with external audio devices 920, such as audio speakers 250, microphones 240, audio disk and tape players and recorders; access and communicate with the Internet 940; access or control peripherals 950, such as still or video cameras, printers, or scanners; or communicate with other PCCs 110, as illustrated for example by FIG. 17. Any combination of these functions may be performed by a given PCC 110. The PCC 110 may itself be controlled by an external control system 341. The external control system 341, might, for example, monitor the status of the pod cluster 600; it might send data to, or receive data from, LAN user devices 300 on the pod cluster 600; or it might define how and what data is exchanged over the pod cluster 600. In a typical configuration, the pods 100 simply use BT radio connection 910 to facilitate communication and control between the PCC 110 and user devices 300.

Figure 10:
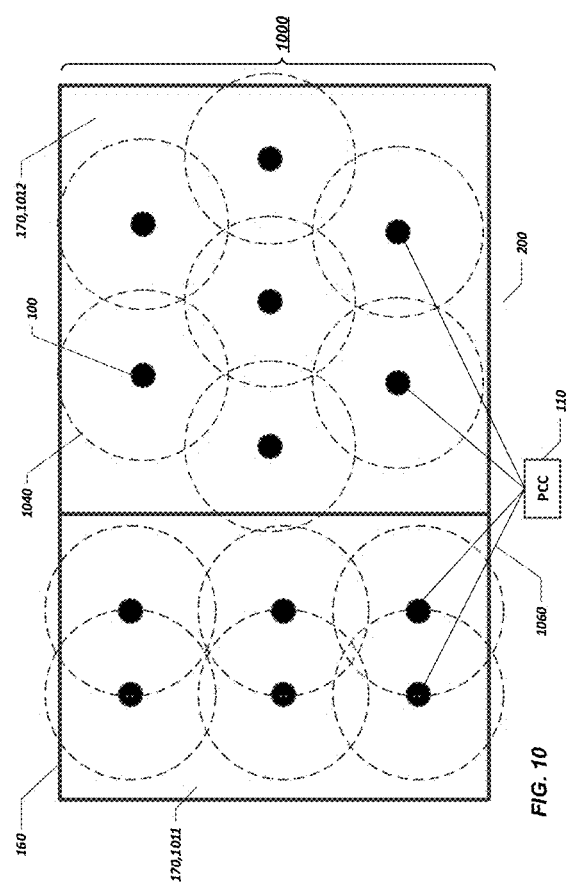
FIG. 10 is a conceptual top view showing two rooms in a building, each room having a cluster of pods providing overlapping PAN coverage.

FIG. 10 is a conceptual diagram showing two rooms 170 in a building 200, each room 170 having a pod cluster 1000, providing PAN coverage. Each pod 100 has a respective pod reception zone (PRZ) 1040. The PRZs 1040 overlap, to provide nearly complete coverage for each room 170. The spacing of the pods 100 happens to be different in room 1011 from room 1012. Note that although all the PRZs 1040 in the figure are idealized circles of the same size, this will not generally be the case. An obstruction to line-of-sight, such as a support column, might modify range. We show the PRZs 1040 centered on pods 100. A given user device 300 must be within range of the pod 100, and the pod 100 must be with range of the user device 300. In particular, even if the pod 100 implements BT 5 a user device 300 implementing BT 4 will still have a range around 10 m.

An audio stream may be broadcast by a PCC 110 to some set of the pods 100. That audio stream might be received by the PCC 110 from any source (or combination of sources); e.g., a presenter using a microphone and a communication system 1060; a network, such as the Internet; or from a recording. Communication between the PCC 110 and the pods 100 could use a communication system 1060. The communication system 1060 may be organized as a peer-to-peer mesh, as a hub and spoke system, or any other type of communication system.

Figure 11A:
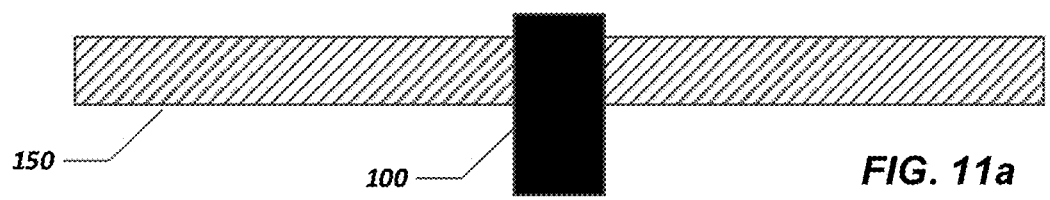
FIG. 11a is a cross-sectional conceptual view that illustrates how a pod might be suspended in, and projecting below, a ceiling.
Figure 11B:
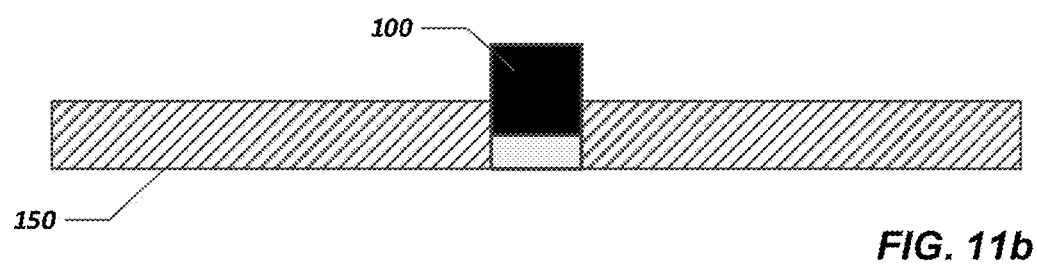
FIG. 11b is a cross-sectional conceptual view that illustrates how a pod might be embedded flush in a ceiling.
Figure 11C:
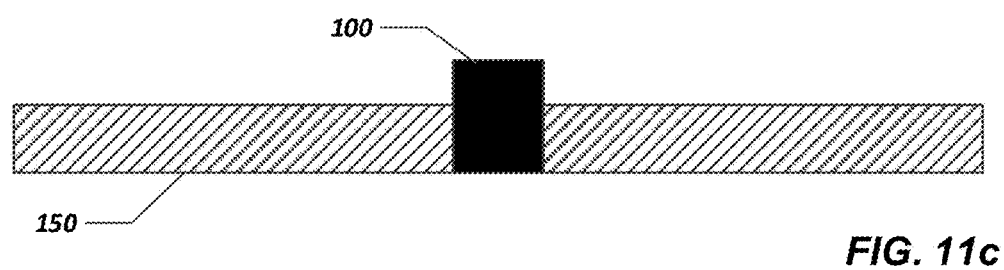
FIG. 11c is a cross-sectional conceptual view that illustrates how a pod might be recessed into a ceiling.
Figure 11D:
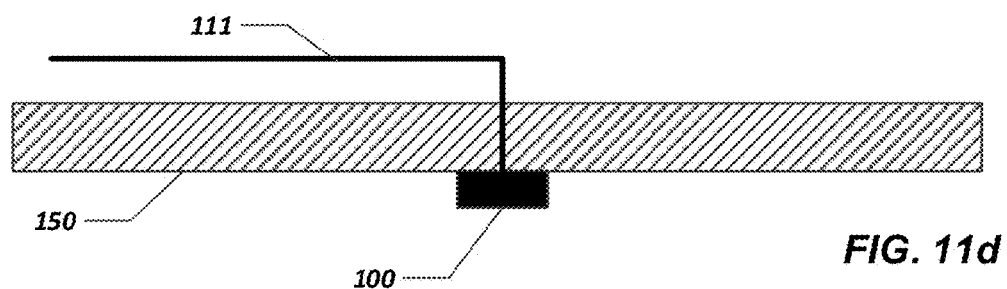
FIG. 11d is a cross-sectional conceptual view that illustrates how a pod might be attached to a ceiling.

A pod 100 might be located anywhere in a room 170. A common approach may be to locate the pods 100 out of the way, such as in a ceiling 150, where they will often have largely unobstructed transmission paths. FIG. 11*a* illustrates how a pod 100 might be suspended in, and projecting below, a ceiling 150. FIG. 11*b* illustrates how a pod 100 might be recessed in a ceiling 150. FIG. 11*c* illustrates how a pod 100 might be embedded flush in a ceiling 150. FIG. 11*d* illustrates how a pod 100 might be suspended below a ceiling 150. This figure also shows a pod cable 111 to a PCC 110.

Note that the system described herein could be used in any type of facility, whether indoors or outdoors. Positioning and detailed structure (e.g., case hardening, waterproofing, suspending) of the pods 100 may need to vary depending on particular characteristics of the venue 160. A sports stadium, an open-air theater in a park, and a church can be expected to be configured differently.

Within the scope of the invention, a pod 100 might be installed anywhere, and might have any geometry. For example, a pod 100 might be mounted in a floor; on a wall; on or under a table or desk; on a column or post. A pod 100 might be suspended by a cable from an overhang in a ballpark. A pod 100 might be freestanding anywhere, not mounted at all.

Figure 12:
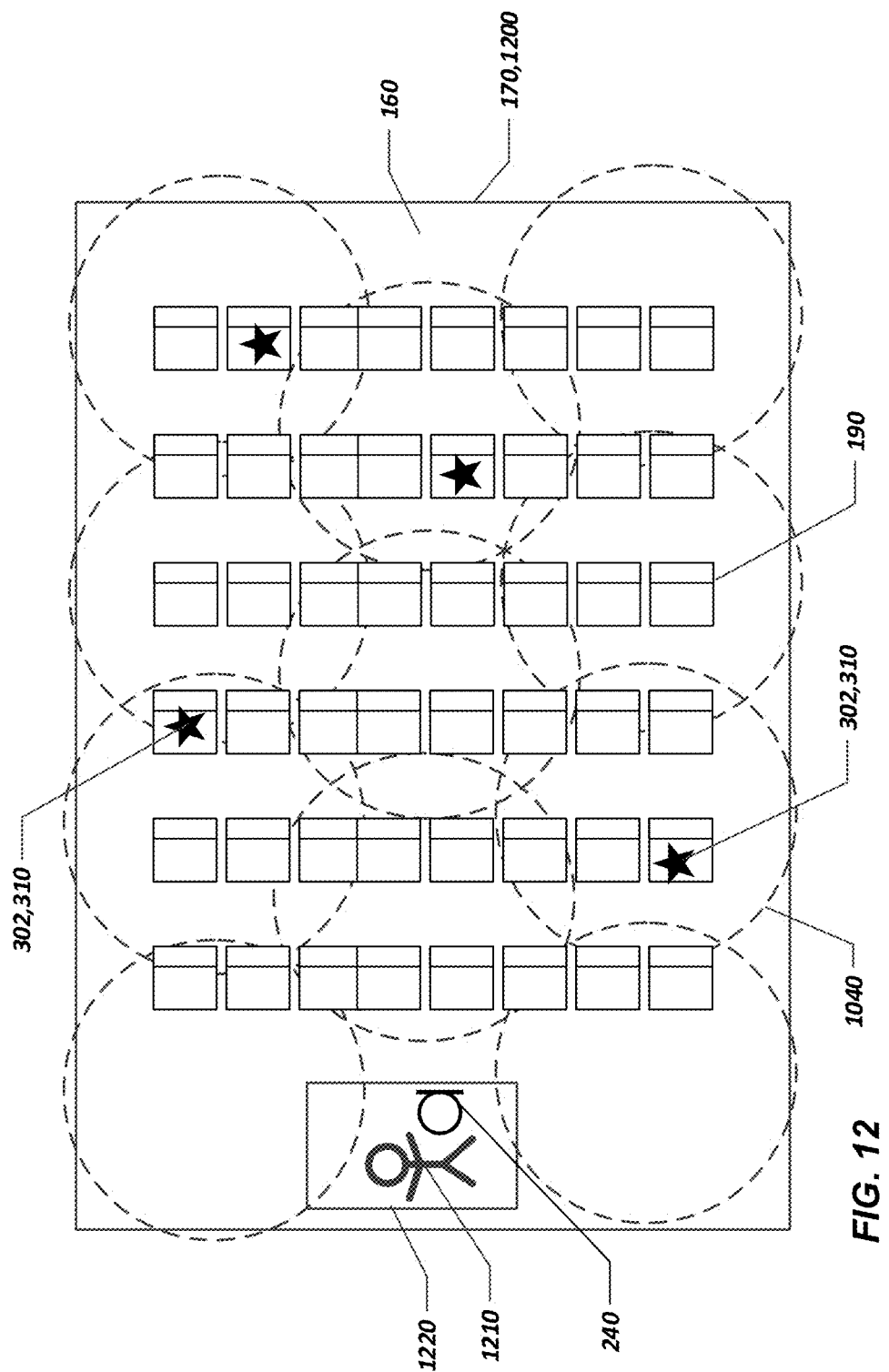
FIG. 12 is a conceptual top view illustrating how a cluster of pods might provide an audio stream to hearing impaired listeners in a lecture hall or church.

FIG. 12 is a conceptual diagram illustrating the use of a pod cluster 1000 to serve a large room 1200, which might be, for example, a lecture hall or church hall. A presenter 1210 addresses an audience from a stage 1220. The voice of the presenter 1210 may be captured by a microphone 240 and transmitted to a PCC 110, which provides the audio stream to the pods 100. The audience includes several 310, randomly positioned in chairs 190, as indicated by stars, who can use their headsets 302 (we assume that headsets and pods 100 are technologically PAN compatible) to enhance hearing of the audio.

Figure 13:
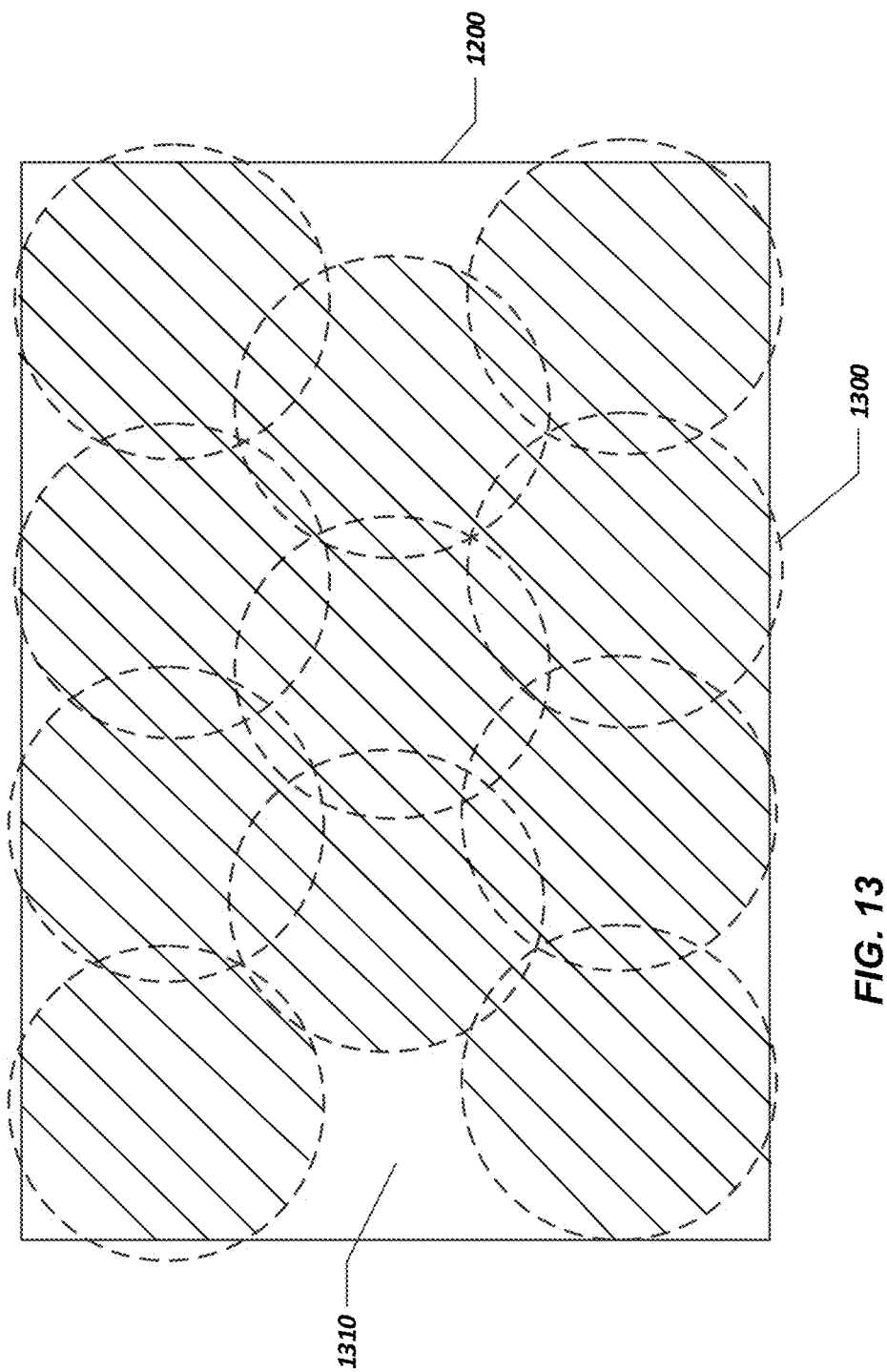
FIG. 13 is a top view showing those portions of the lecture hall or church that have PAN reception coverage, and those that are not covered, using the cluster configuration of the previous figure.

FIG. 13 shows those portions of room 1200 in FIG. 12 that are covered by the cluster coverage area 1300, formed by the combination of the PRZs 1040 of the pods 100. Because of the distribution of the pods 100, all members of the audience, regardless of where they sit, will receive the audio broadcast from the pods 100. Some areas of room 1200 are dead zones 1310 of PAN coverage. These areas might include, for example, the stage where the presenter is standing, and the entrance area to the hall. In short, a room 170 might include an audience area, which includes people who might want to use headsets 302, to take advantage of the system; and a remainder area, where audience members will not typically be located during the audio broadcast. The pods 100 may be strategically located to completely cover all of the audience area, but some or all of the remainder area might be dead zone 1310, to reduce costs of installation and maintenance. FIG. 13 illustrates a configuration of pods 100 that creates a connected region, a "designated audience area" which corresponds to expected need, containing no internal gaps in coverage. In some embodiments, the pods 100 might be arranged so that an entire venue is completely covered.

Figure 14:
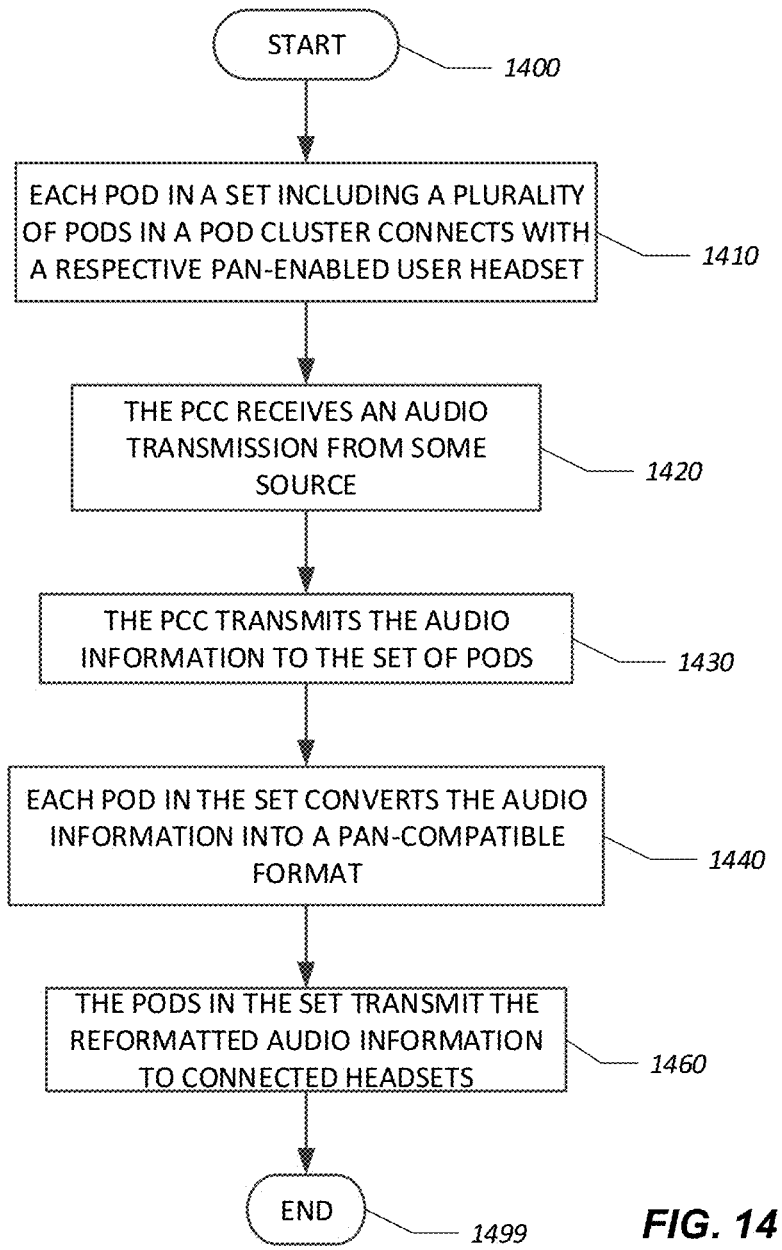
FIG. 14 is a flowchart illustrating an exemplary process for assisted listening using a pod cluster.

FIG. 14 is a flowchart illustrating an exemplary process for assisted listening using a pod cluster 1000. After the start 1400, each pod 100 in a set, which includes a plurality of pods 100 in a pod cluster 1000, connects 1410 the PAN with a respective PAN-enabled headset 302. The PCC 110 that controls the pod cluster 1000 receives 1420 an audio transmission from some source or combination of sources, as enabled by the various interfaces typified by FIG. 3. The PCC 110 transmits 1430 the audio information through its pod interface 331 interface to the pods 100 in the set. The pods 100 in the set each receive the audio information, and convert 1440 the audio into a format compatible with the supported PAN type. Each pod 100 in the set transmits 1460 the reformatted audio information to the connected headsets 302.

Figure 15:
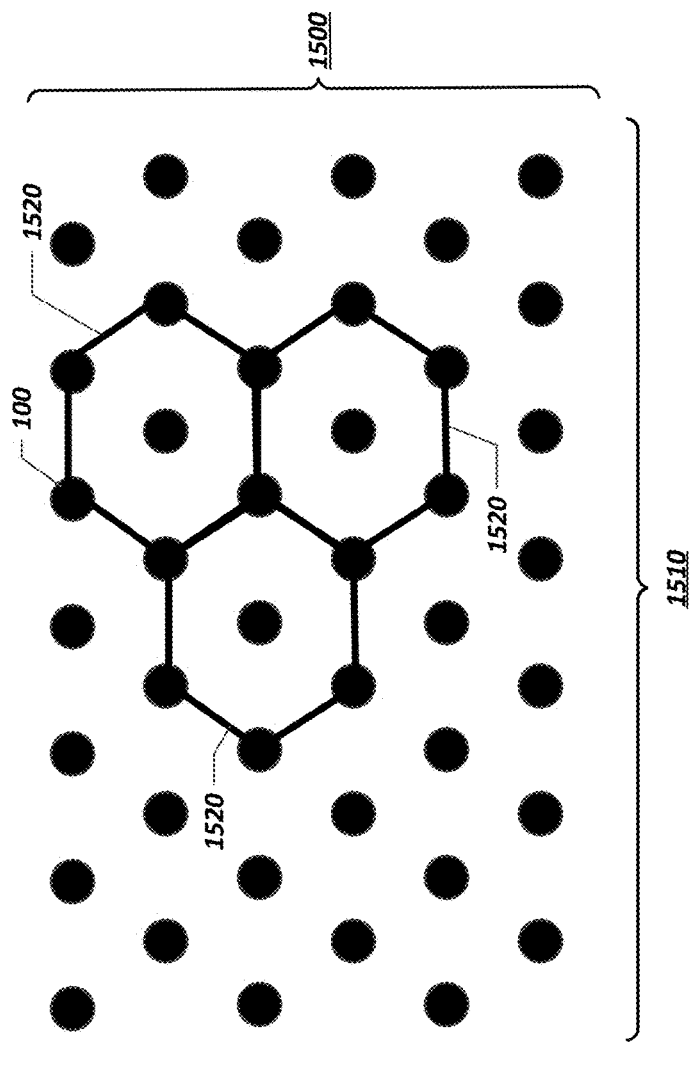
FIG. 15 is a conceptual diagram that illustrates a hexagon-based layout for a PT cluster.
Figure 16:
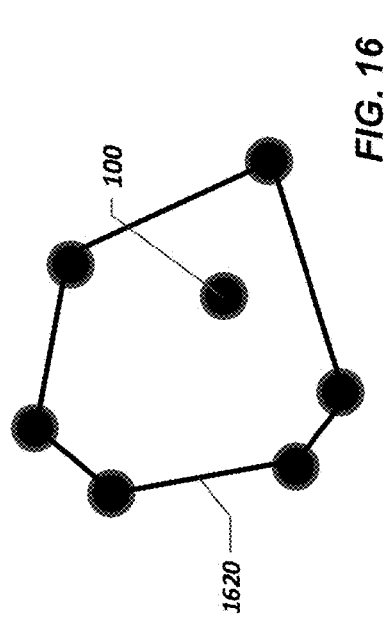
FIG. 16 illustrates a pod surrounded by an asymmetrical hexagon of pods.

FIG. 15 illustrates a hexagon-based layout for a pod cluster 600, the pods 100 arranged in a grid of rows 1500 and columns 1510. Generally, a plurality of pods 100 can be arranged in any configuration within the scope of the invention. An arrangement that includes one such hexagon pattern 1520 or a plurality of hexagon patterns 1520 is particularly effective in maximizing coverage for a given number of pods 100. In some embodiments such as the one depicted by FIG. 15, within some subregion, alternating rows 1500 of pods 100 are offset by half of the horizontal pod spacing. FIG. 16 shows an exemplary asymmetrical hexagon 1620 pattern.

Figure 17:
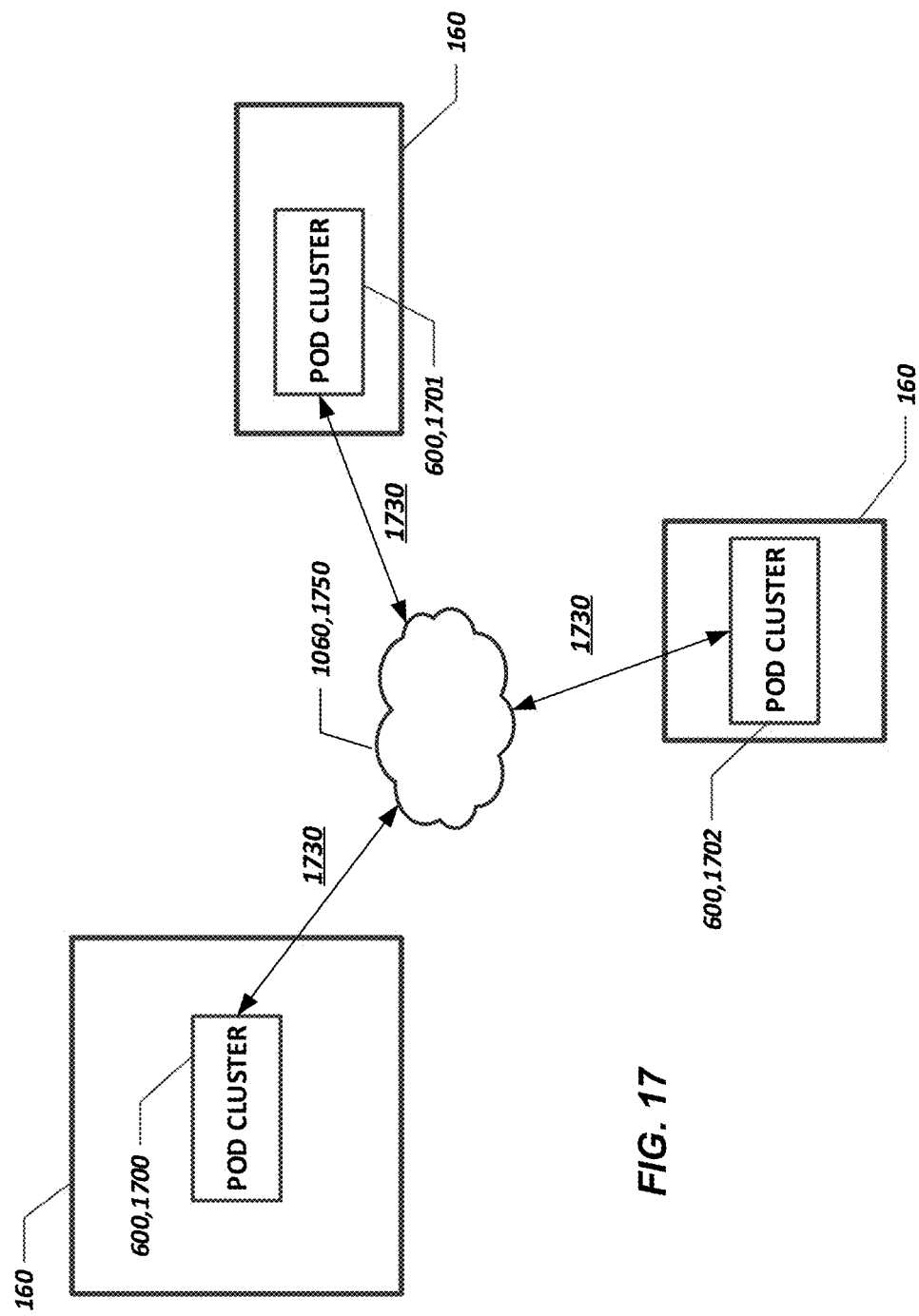
FIG. 17 is a conceptual diagram that illustrates how pod clusters might provide coverage of a single audio stream in a plurality of venues.

FIG. 17 illustrates how pod clusters 1000 might provide coverage of a single audio stream to a plurality of venues 160, located remotely from each other. Each of three venues 160 has a PCC 110, which manages a respective pod cluster 600 within that building 200. The PCCs 110 have communication access 1730 to some common communication system 1060, such as the Internet. One of those PCCs 110 may provide the audio to the other two, or each of the venues 160 might be a source for audio provided to the others. Any other audio-sharing arrangement is possible within the scope of the invention.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. A system, comprising:
   a) a first pod, having a pod structure, wherein a pod structure includes
      (1) a personal area network (PAN) transceiver, which provides wireless networking to a pod PAN, communicating with an external device connected to the pod PAN using a PAN communication protocol,
      (2) a pod cluster controller (PCC) interface, distinct from the transceiver, whereby the pod communicates audio data with an external PCC, and
      (3) a digital audio interface, which reformats audio communications between the transceiver and the controller communication interface, and
      (4) a housing, enclosing the transceiver, the PCC interface, and the digital audio interface.

2. The system of claim 1, wherein the first pod does not connect to analog audio devices except through the PCC interface or through the transceiver.

3. The system of claim 1, wherein the first pod does not perform digital or analog audio mixing.

4. The system of claim 1, wherein the first pod cannot connect directly to the Internet.

5. The system of claim 1, wherein the PAN communication protocol is Bluetooth® (BT).

6. The system of claim 1, wherein any audio data transmitted by the first pod is transmitted either through its PCC interface or through its transceiver.

7. The system of claim 1, wherein any audio data received by the first pod is received either through its first PCC interface or through its first transceiver.

8. The system of claim 1, wherein the pod structure does not include a multiplexer.

9. The system of claim 1, further comprising:
   b) a PCC, contained in a housing external to and remote from the housing of the first pod, including
      (1) a first pod interface, whereby the PCC communicates audio and control data with the first pod through the PCC interface of the first pod,
      (2) an audio interface, through which the PCC communicates audio data with a first source, which is external to the first pod and external to the PCC,
      (3) a mixer, which combines audio data received through the pod interface with audio data from a second source, and
      (4) a central processing unit.

10. The system of claim 9, the pod structure further including:
   (5) a digital control interface, which transmits control information received from the transceiver through the PCC interface, and transmits control information received through the PCC interface to the transceiver.

11. The system of claim 9, wherein the PCC serves as a hub that exchanges audio data and control information with and among one or more pods in a set of pods, each pod in the set implementing wireless PAN communication with user PAN devices.

12. The system of claim 9, wherein the PCC serves as a hub for that exchanges audio data among the first pod, a microphone external to the PCC, and a speaker external to the PCC.

13. The system of claim 9, wherein the second source is a second pod communication interface, through which the PCC communicates with a second pod.

14. The system of claim 9, wherein the PCC communicates with the second source through an external communication interface other than a pod interface.

15. The system of claim 9, further comprising:
c) a cable connector connecting the first pod communication interface with the first PCC interface, the cable containing a bidirectional audio channel and a bidirectional communication and control channel, whereby the first pod and the PCC exchange audio, communication, and control data.

16. The system of claim 15, the first pod further including
(5) a power converter, which converts electrical power received through the first PCC interface into a form of electrical power usable by a component of the first pod.

17. The system of claim 9, wherein the first pod receives a request for action through its transceiver and transmits the request through its PCC interface to the PCC, and the PCC takes action in response to the request, wherein the action taken by the PCC includes accessing a peripheral device, or accessing the Internet.

18. The system of claim 9, wherein the PCC transmits a request for action through the pod communication interface, and the first pod takes action in response to the request.

19. The system of claim 9, wherein the action taken by the first pod includes transmitting visual information to a PAN.

20. The system of claim 9, further comprising:
c) a microphone in a venue, which transmits outbound audio information from the venue to the PCC, wherein the PCC transmits the outbound audio information through a communication interface; and
e) a speaker system in the venue that receives and broadcasts inbound audio information from the PCC.

21. The system of claim 9, further comprising:
c) a second pod, having the pod structure, wherein the PCC includes a second pod communication interface, whereby the PCC communicates audio and control data with the second pod through the PCC communication interface of the second pod.

22. The system of claim 21, wherein the first pod receives power from the PCC through the first PCC communication interface, and the second pod receives power from the PCC through the second PCC communication interface.

23. The system of claim 21, wherein the first pod is located in a first room, distinct from a second room where the PCC is located, and the second pod is located in a third room, distinct from the second room but not necessarily distinct from the first room.

24. The system of claim 9, further comprising:
c) a plurality of other pods, each having the pod structure and each having communication access through its PCC communication interface with the PCC;
d) a designated, nonempty, audience spatial area within a venue, the spatial area being not necessarily contiguous, wherein the pods in a set of pods, which includes the first pod and the plurality of other pods, are deployed in a spatial arrangement such that all locations within the designated audience spatial area are within the respective PAN of at least one pod in the set.

25. The system of claim 24, further comprising:
e) a plurality of headsets within the designated audience areas, connected via a PAN to a transceiver of a pod in the set of pods, wherein the PCC transmits to the set of pods an item of audio information, and each headset in the plurality of headsets receives the item through its respective PAN.

26. The system of claim 1, wherein the first pod is installed in the ceiling of a room.

27. A method, comprising:
a) making a respective PAN connection by each of a plurality of pods in a pod cluster, with a respective cluster-enabled headset;
b) receiving by a pod cluster controller (PCC), which is separately housed from each of the pods in the pod cluster, and which manages, and is in communication with, the pods in the pod cluster, audio information from a source;
c) transmitting by the PCC the audio information to each of the pods in the pod cluster;
d) converting, by each pod in the pod cluster, the audio information into a PAN-compatible format; and
e) transmitting the audio information by each pod in the plurality, in PAN-compatible format, to the cluster-enabled headset to which it is connected.

* * * * *